(12) United States Patent
Kikumoto

(10) Patent No.: US 11,200,016 B2
(45) Date of Patent: Dec. 14, 2021

(54) PRINT DATA CONTROL APPARATUS TO INSTRUCT ANOTHER PRINTING APPARATUS AT TRANSMISSION DESTINATION TO PERFORM DESIRED PROCESS, PRINTING APPARATUS THEREOF, AND PRINTING SYSTEM

(71) Applicant: FUJIFILM Business Innovation Corp., Tokyo (JP)

(72) Inventor: Takashi Kikumoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 196 days.

(21) Appl. No.: 16/355,827

(22) Filed: Mar. 17, 2019

(65) Prior Publication Data
US 2019/0324698 A1     Oct. 24, 2019

(30) Foreign Application Priority Data

Apr. 19, 2018   (JP) .............................. JP2018-080374

(51) Int. Cl.
*G06F 3/12*     (2006.01)
(52) U.S. Cl.
CPC ............ *G06F 3/126* (2013.01); *G06F 3/1206* (2013.01); *G06F 3/1226* (2013.01); *G06F 3/1279* (2013.01); *G06F 3/1291* (2013.01)

(58) Field of Classification Search
None
See application file for complete search history.

(56) References Cited

U.S. PATENT DOCUMENTS

| 2008/0259399 | A1* | 10/2008 | Wada ..................... G06F 3/1222 |
| | | | 358/1.15 |
| 2012/0092723 | A1* | 4/2012 | Jaudon .................. G06F 3/1204 |
| | | | 358/1.15 |
| 2012/0218576 | A1* | 8/2012 | Sekine ..................... G06F 3/122 |
| | | | 358/1.13 |
| 2018/0293032 | A1* | 10/2018 | Hakamata ............. G06F 3/1285 |

FOREIGN PATENT DOCUMENTS

JP        2006-185097         7/2006

* cited by examiner

*Primary Examiner* — Lennin R Rodriguezgonzalez
(74) *Attorney, Agent, or Firm* — JCIPRNET

(57) ABSTRACT

A print data control apparatus includes a reception section that receives print data which is to be printed in a first printing apparatus; a transmission section that transmits the print data, which is received by the reception section, to a second printing apparatus; an information acquisition section that acquires information related to the second printing apparatus; and an acceptance section that accepts an instruction which is to be provided to the second printing apparatus that designates a type of processing with respect to the print data transmitted by the transmission section, that is, an instruction which is selected based on information acquired by the information acquisition section.

18 Claims, 11 Drawing Sheets

FIG. 5

| | | | | | | | | | | | | | |
|---|---|---|---|---|---|---|---|---|---|---|---|---|---|
| TRANSFER | NAME | ADDRESS | PRINTER | STATUS | VERSION | PAPER TRAY | TONER INK | JOB NAME | JOB STATE | NUMBER OF PAGES | NUMBER OF COPIES | PRINT | REMAINING TIME |
| ✓ | COLOR 1 | 111.22.33.44 | MODEL NAME 1 | BEING PRINTED | 2.0.1 | | | TestA4-500p.pdf | BEING PRINTED | 500 | 1 | | 00:04:25 |
| | MONOCHROME 1 | 111.22.33.555 | MODEL NAME 2 | IT IS POSSIBLE TO PERFORM PRINTING | 2.0.1 | | | | | | | | |
| ✓ | COLOR 2 | 111.22.33.44 | MODEL NAME 3 | IT IS POSSIBLE TO PERFORM PRINTING | 1.6.7 | | | | | | | | |
| | COLOR 3 | 111.22.33.55 | MODEL NAME 4 | SAVING POWER | 1.4.1 | | | | | | | | |
| R1 | R2 | R3 | R4 | R5 | R6 | R7 | R8 | R9 | R10 | R11 | R12 | R13 | R14 |

JOB TRANSFER

TRANSFER DESTINATION 300
310
L1 L2 L3 L4

OPERATION AFTER RECEPTION AT TRANSFER DESTINATION
● POSTPONE JOB
○ POSTPONE JOB AFTER RIP
○ PERFORM PRINT

☐ DELETE JOB IN WHICH TRANSFER IS COMPLETED

304

CANCEL (c)    OK

PRINT DATA CONTROL APPARATUS TO INSTRUCT ANOTHER PRINTING APPARATUS AT TRANSMISSION DESTINATION TO PERFORM DESIRED PROCESS, PRINTING APPARATUS THEREOF, AND PRINTING SYSTEM

CROSS-REFERENCE TO RELATED APPLICATIONS

This application is based on and claims priority under 35 USC 119 from Japanese Patent Application No. 2018-080374 filed Apr. 19, 2018.

BACKGROUND

(i) Technical Field

The present invention relates to a print data control apparatus, a printing apparatus, and a printing system.

(ii) Related Art

JP2006-185097A discloses a method for managing data stored in storage means provided in each of a plurality of servers which are connected to each other via a network. Any one of the plurality of servers is set as a transfer source and any one of the other servers is set as a transfer destination. In a case where the data stored in the transfer source server is transferred to the transfer destination server, information which specifies data to be transferred and information which specifies the transfer destination server are generated and the generated information is stored in the transfer source server.

SUMMARY

There are problems in that, even in a case where print data is transmitted from a printing apparatus, which accepts the print data, to another printing apparatus, a state is made in which it is not possible for another printing apparatus at a transmission destination to process the received print data or another printing apparatus does not have a performance to perform, for example, a desired process which is pertaining to the print data. Furthermore, in the above described case, for example, waiting time until printing is performed is long or the printing is not performed, and thus the desired process is not performed in another printing apparatus at the transmission destination.

Aspects of non-limiting embodiments of the present disclosure relate to a print data control apparatus, a printing apparatus, and a printing system in which it is possible to easily cause a printing apparatus at a transmission destination to perform a desired process, compared to a case where it is not possible to instruct another printing apparatus at the transmission destination about a type of a process of the print data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a print data control apparatus including: a reception section that receives print data which is to be printed in a first printing apparatus; a transmission section that transmits the print data, which is received by the reception section, to a second printing apparatus; an information acquisition section that acquires information related to the second printing apparatus; and an acceptance section that accepts an instruction which is to be provided to the second printing apparatus that designates a type of processing with respect to the print data transmitted by the transmission section, that is, an instruction which is selected based on information acquired by the information acquisition section.

BRIEF DESCRIPTION OF THE DRAWINGS

Exemplary embodiment(s) of the present invention will be described in detail based on the following figures, wherein:

FIG. 5 is a diagram illustrating a display manipulation screen which is displayed on a display unit of a printing apparatus illustrated in FIG. 2;

DETAILED DESCRIPTION

Figure 1:
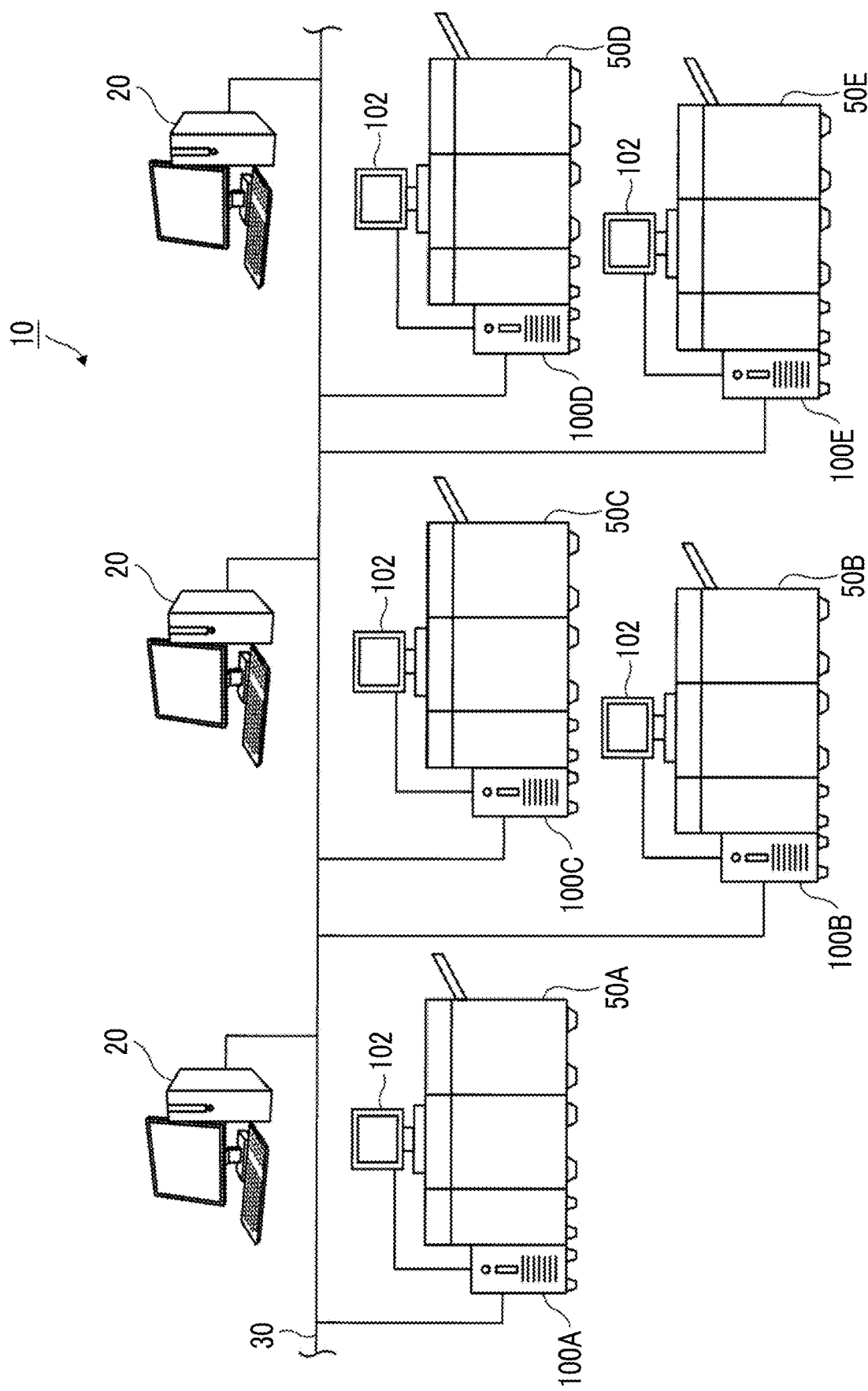
FIG. 1 is a diagram illustrating a configuration of a first example of a printing system used in an exemplary embodiment of the present invention.

Hereinafter, an exemplary embodiment of the present invention will be described in detail with reference to the accompanying drawings. FIG. 1 is a diagram illustrating a first example of a printing system 10 according to the exemplary embodiment of the present invention. As illustrated in FIG. 1, the printing system 10 includes a plurality of terminal apparatuses 20, a plurality of, for example, five or the like printing apparatuses 50, and controllers 100 which respectively control the plurality of printing apparatuses 50. The plurality of terminal apparatuses 20 and the plurality of controllers 100 are connected to each other via a network 30.

The terminal apparatus 20 is used to prepare print data to be printed in the printing apparatus 50, the print data which is prepared in the terminal apparatus 20 is transmitted to any one of the plurality of controllers 100, and the print data which is transmitted to the controller 100 is printed in the printing apparatus 50. Here, the controller 100 is an example of a print data control apparatus which controls the print data. In addition, the print data is, for example, document data which is generated by document writing application software or document data which is described in page description language such as Post Script (registered trademark).

The plurality of controllers 100 respectively include touch panels 102. In addition, the plurality of respective controllers 100 are connected to each other via the network 30, and it is possible to transmit (transfer) the print data, which is transmitted from the terminal apparatus 20, from one controller 100 to another controller 100. Furthermore, another controller 100, to which the print data is transmitted, causes the printing apparatus 50, which is controlled by the controller 100, to print the transmitted (transferred) print data.

The plurality of printing apparatuses 50 respectively form images on, for example, recording media such as paper. Here, the recording media are examples of expendable supplies used in the printing apparatuses 50. In addition, an electronic picture method is applied to the printing apparatuses 50, and the printing apparatuses 50 form the images using charged toners. Here, the charged toners are examples of ink which is used in the printing apparatuses 50, and are examples of the expendable supplies used in the printing apparatuses 50.

Models of all the plurality of printing apparatuses 50 may be the same or a plurality of models may be mixed. In a case where the plurality of models are mixed as the plurality of printing apparatuses 50, a plurality of types of printing apparatuses 50 which have different performances from each other are mixed. In addition, there is a case where the plurality of printing apparatuses 50 include post-processing apparatuses which are different from each other. Here, the post-processing apparatus refers to an apparatus, such as a binding apparatus for binding the recording media acquired after printing is performed and a folding apparatus for folding the recording media acquired after printing is performed, which performs a process on the recording media acquired after printing is performed.

In addition, there is a case where the printing apparatuses 50, which have the same model but have, for example, different control software versions, are mixed among the plurality of printing apparatuses 50. Furthermore, there is a case where the performances of the printing apparatuses 50, which have the different control software versions, are different from each other.

In the description below, in a case where five controllers 100 are respectively distinguished from each other, there is a case where the respective controllers 100 are referred to as a controller 100A, a controller 100B, a controller 100C, a controller 100D, and a controller 100E. In addition, in a case where five printing apparatuses are distinguished from each other in the description below, there is a case where the printing apparatus 50 controlled by the controller 100A is referred to as a printing apparatus 50A, the printing apparatus 50 controlled by the controller 100B is referred to as a printing apparatus 50B, the printing apparatus 50 controlled by the controller 100C is referred to as a printing apparatus 50C, the printing apparatus 50 controlled by the controller 100D is referred to as a printing apparatus 50D, and the printing apparatus 50 controlled by the controller 100E is referred to as a printing apparatus 50E.

Figure 2:
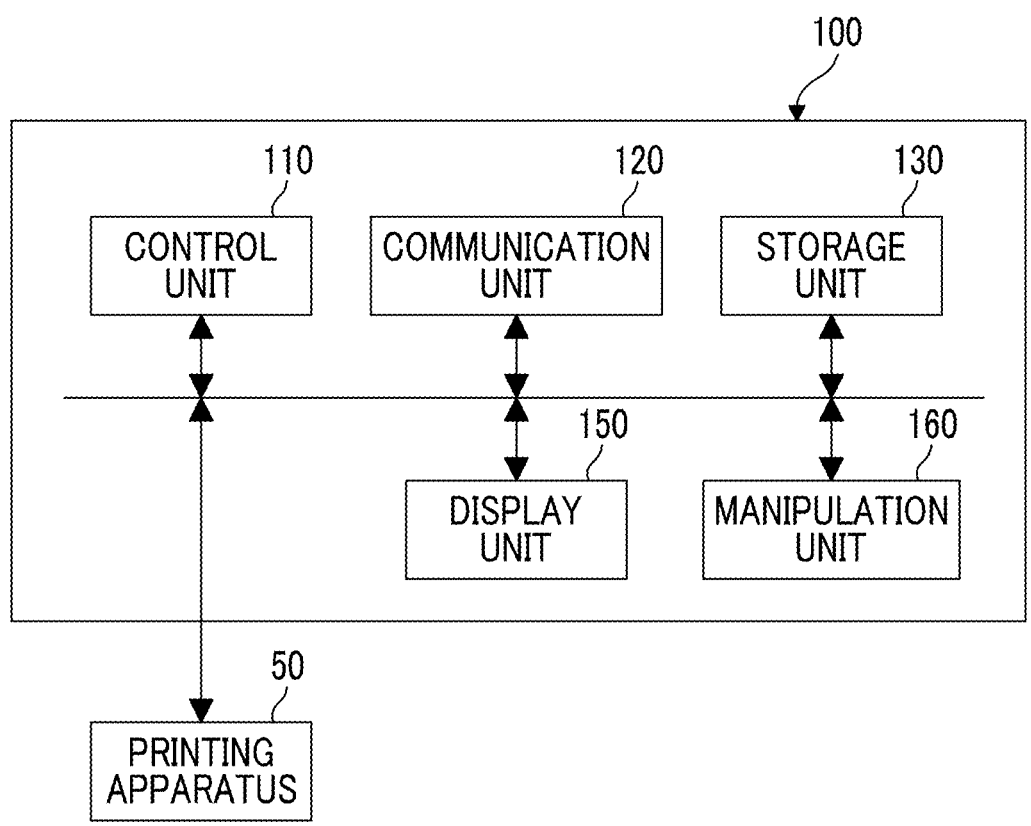
FIG. 2 is a diagram illustrating a hardware configuration of a controller included in the printing system illustrated in FIG. 1.

FIG. 2 is a diagram illustrating a hardware configuration of the controller 100. As illustrated in FIG. 2, the controller 100 includes a control unit 110, a communication unit 120, a storage unit 130, a display unit 150, and a manipulation unit 160.

The control unit 110 includes a Central Processing Unit (CPU), a Read Only Memory (ROM), a Random Access Memory (RAM), and the like. In a case where the CPU reads and executes a computer program (hereinafter, simply referred to as a program) which is stored in the ROM or the storage unit 130, the CPU controls each of the units of the controller 100 and the printing apparatus 50.

The communication unit 120 is a communication circuit which is connected to the network 30 in wired or wireless manner. The controller 100 communicates with the terminal apparatus 20 or another controller 100 via the network 30 using the communication unit 120.

The storage unit 130 is large-capacity storage means, such as a hard disk drive, and stores the program which is read by the CPU of the control unit 110. In addition, the storage unit 130 stores the print data and image data which is acquired by converting the print data.

For example, a display screen, such as a display manipulation screen 300 which will be described later, is displayed on the display unit 150. For example, it is possible to use a liquid crystal display panel, a touch panel, or the like as the display unit 150.

The manipulation unit 160 is used to manipulate the printing apparatus 50, and it is possible to use, for example, a keyboard, a touch panel, or the like. In a case where the touch panel is used as the manipulation unit 160, the touch panel may be used as the display unit 150 as well as the manipulation unit 160. In the exemplary embodiment, one touch panel 102 (refer to FIG. 1) is used as the manipulation unit 160 as well as the display unit 150.

The printing system 10 is a system in which the print data is transmitted (transferred) from any one of the controller 100A, the controller 100B, the controller 100C, the controller 100D, and the controller 100E to another controller 100. Hereinafter, a case where the print data is transmitted from the controller 100A and the print data is further transmitted from the controller 100A to the controller 100B, which is selected from the controller 100B, the controller 100C, the controller 100D, and the controller 100E, will be described as an example.

That is, hereinafter, a case where the printing apparatus 50A is used as an example of a first printing apparatus, the printing apparatus 50B is used as an example of a second printing apparatus, and the print data received in the controller 100A to be printed in the printing apparatus 50A is transmitted to the printing apparatus 50B (controller 100B) will be described as an example.

Figure 3:
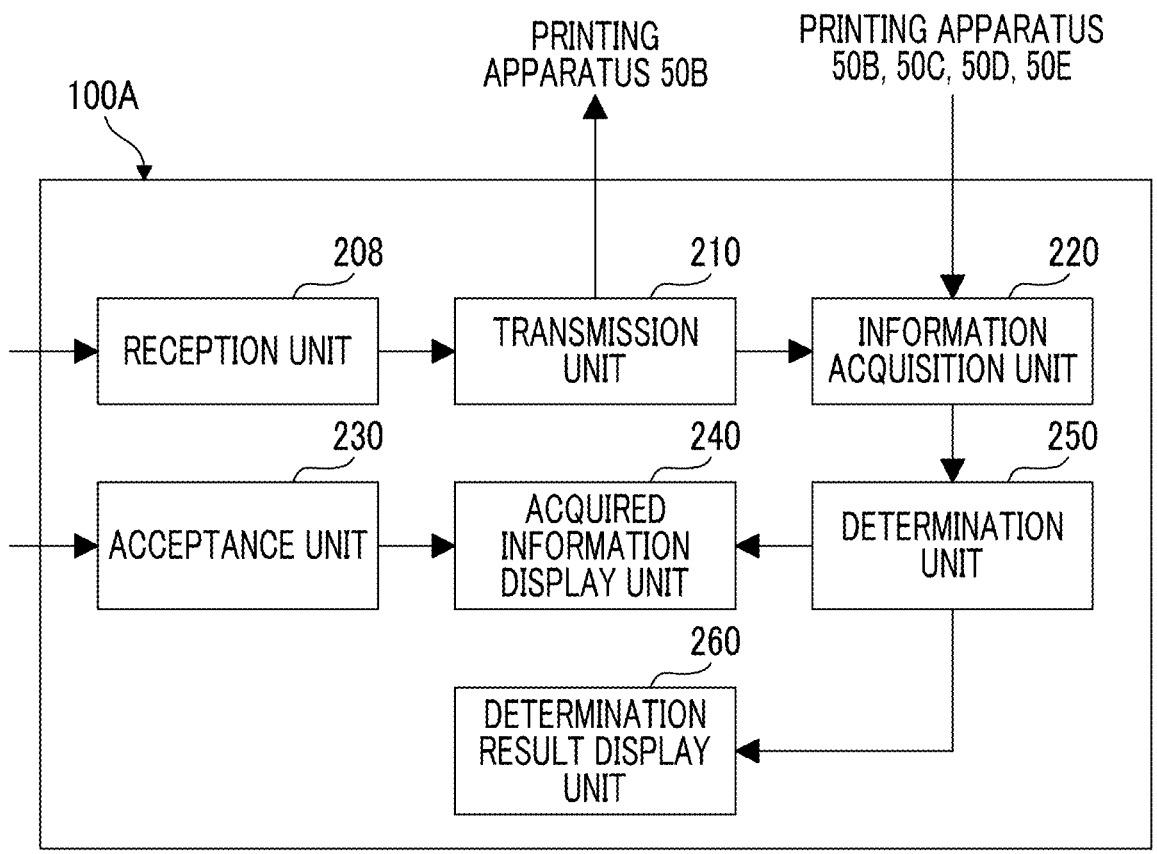
FIG. 3 is a first diagram illustrating a functional configuration of the controller illustrated in FIG. 2.

FIG. 3 is a diagram illustrating a function of the controller 100A and is a diagram illustrating a function in a case where the controller 100A is used as the print data control apparatus which transmits the print data. As illustrated in FIG. 3, the controller 100A functions as a reception unit 208, a transmission unit 210, an information acquisition unit 220, an acceptance unit 230, an acquired information display unit 240, a determination unit 250, and a determination result display unit 260.

More specifically, in the controller 100A, the communication unit 120 functions as the reception unit 208 by receiving the print data which is printed in the printing apparatus 50A.

In addition, in the controller 100A, the communication unit 120 functions as the transmission unit 210 by transmitting the print data, which is received by the reception unit 208, to, for example, the printing apparatus 50B.

In addition, in the controller 100A, the communication unit 120 functions as the information acquisition unit 220 by acquiring pieces of information related to the printing apparatus 50B, the printing apparatus 50C, the printing apparatus 50D, and the printing apparatus 50E (hereinafter, referred to as the printing apparatus 50B and the like). Here, the information acquisition unit 220 acquires the pieces of information of the printing apparatus 50B and the like by inquiring of the printing apparatus 50B and the like about the pieces of information of the printing apparatus 50B and the like and acquiring responses from the printing apparatus 50B and the like. Here, it is desired that the information acquisition unit 220 acquires data related to the plurality of printing apparatuses 50 and acquires data related to the whole printing apparatuses 50 connected to the network 30.

In addition, in the controller 100A, the manipulation unit 160 functions as the acceptance unit 230 by accepting an instruction, which is provided to the printing apparatus 50B and the like that designates a type of processing with respect to the print data transmitted by the transmission unit 210, and an instruction which is selected by the manipulator based on the pieces of information acquired by the information acquisition unit 220.

In addition, in the in the controller 100A, the display unit 150 functions as the acquired information display unit 240 by displaying the pieces of information acquired by the information acquisition unit 220.

In addition, in the controller 100A, the control unit 110 functions as the determination unit 250 by determining whether or not to transmit the print data to the printing apparatus 50B and the like using the pieces of information acquired by the information acquisition unit 220.

In addition, in the controller 100A, the display unit 150 functions as the determination result display unit 260 by displaying a determination result acquired by the determination unit 250.

Here, as an example of the data related to the printing apparatus 50, which is acquired by the information acquisition unit 220, it is possible to use data related to a work state, which is referred to as a status, of the printing apparatus 50. As an example of the work state of the printing apparatus 50, it is possible to use "printable" indicative of a state in which it is possible to print the print data, "being printed" indicative of a state in which another print data is being printed, "waiting" indicative of a state of waiting for the print data to be printed, and the like.

In addition, as the example of the work state of the printing apparatus 50, it is possible to further use "vague" indicative of a state in which power of the printing apparatus 50 is OFF and the state of the printing apparatus 50 is vague, "temporary stop" indicative of a state in which the printing apparatus 50 is temporarily stopped, "saving power" indicative of a state in which the printing apparatus 50 is in a power saving mode, "maintenance" indicative of a state in which the printing apparatus 50 is under maintenance, "error" indicative of a state in which an error is generated in the printing apparatus 50, and the like.

In addition, in a case where the work state of the printing apparatus 50 is "being printed", it is desired that the information acquisition unit 220 acquires time, which is taken until the printing of the print data which is "being printed" is completed, as the information related to the printing apparatus 50. In addition, in a case where the work state of the printing apparatus 50 is "waiting", it is desired that the information acquisition unit 220 acquires the number of print data, which is waiting for to be printed, as the information related to the printing apparatus 50.

In addition, as another example of the data related to the printing apparatus 50, which is acquired by the information acquisition unit 220, it is possible to use information related to a residual quantity of the expendable supplies which are allowed to be used by the printing apparatus 50. Furthermore, as an example of the expendable supplies, for example, it is possible to use the recording medium, such as paper, or the charged toner which is the example of the ink.

In addition, as an example of another data related to the printing apparatus 50, which is acquired by the information acquisition unit 220, it is possible to use the data related to the performance of the printing apparatus 50. Furthermore, as an example of the data related to the performance of the printing apparatus 50, it is possible to use information which specifies the model of the printing apparatus 50, a version of the printing apparatus 50, a type of post-processing which is allowed to be performed in the printing apparatus 50, and a capacity of the print data which is allowed to be stored in the storage unit 130 of the controller 100 corresponding to the printing apparatus 50 that is a print data transmission destination.

It is possible for the acceptance unit 230 to accept an instruction to cause the printing apparatus 50B and the like to directly print the print data, and it is possible for the acceptance unit 230 to accept an instruction to cause the printing apparatus 50B and the like to postpone printing of the print data. In addition, it is possible for the acceptance unit 230 to instruct the printing apparatus 50B and the like to convert the print data into the image data, and it is possible for the acceptance unit 230 to accept the instruction to postpone the printing of the image data.

In addition, it is possible for the acceptance unit 230 to accept an instruction to transmit the print data to any one printing apparatus including the printing apparatus 50B, the printing apparatus 50C, the printing apparatus 50D, and the printing apparatus 50E, which are the plurality of printing apparatuses.

Figure 4:
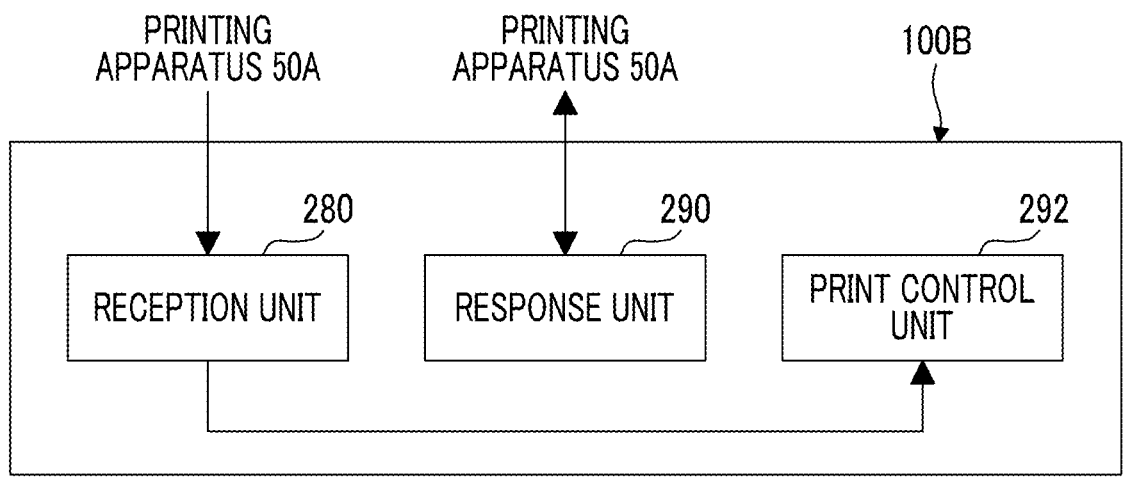
FIG. 4 is a second diagram illustrating the functional configuration of the controller illustrated in FIG. 2.

FIG. 4 is a diagram illustrating a function of the controller 100B, and is a diagram illustrating a function in a case where the controller 100B receives the print data transmitted from the controller 100A and causes the printing apparatus 50B to print the received print data. As illustrated in FIG. 4, the controller 100B functions as a reception unit 280, a response unit 290, and a print control unit 292.

More specifically, in the controller 100B, the communication unit 120 functions as the reception unit 280 by receiving the print data which is transmitted from the controller 100A.

In addition, in the controller 100B, the communication unit 120 functions as the response unit 290 by responding to a state inquiry from the controller 100A and transmitting the information related to the printing apparatus 50B.

In addition, in the controller 100B, the control unit 110 functions as the print control unit 292 by controlling a print schedule of the print data, which is received by the reception unit 280, in the printing apparatus 50B.

FIG. 5 illustrates the display manipulation screen 300 which is displayed on the touch panel 102 of the controller 100A. Here, the touch panel 102 is an example of the display unit 150 and is an example of the manipulation unit 160.

The display manipulation screen 300 shows the pieces of information related to the printing apparatus 50B, the printing apparatus 50C, the printing apparatus 50D, and the printing apparatus 50E, the pieces of information being acquired by the information acquisition unit 220. More specifically, the information related to the printing apparatus 50B is displayed on a line L1 of a table 310 disposed at an upper part of the display manipulation screen 300, the information related to the printing apparatus 50C is displayed on a line L2, the information related to the printing apparatus 50D is displayed on a line L3, and the information related to the printing apparatus 50E is displayed on a line L4.

In addition, whether or not to transmit the print data to each of the printing apparatuses 50, which is determined by the determination unit 250, is displayed in a row R1 of the table 310.

More specifically, a check mark is displayed on a line indicative of the information of the printing apparatus 50 in which it is determined that the transmission of the print data is possible, and the check mark is not displayed on a line indicative of the information of the printing apparatus 50 in which it is determined that the transmission of the print data is not possible.

In addition, in a row R2 of the table 310, a name, which is acquired by the information acquisition unit 220, of the printing apparatus 50, that is, a name of each of the printing apparatuses 50 in the network 30 is displayed. In addition, in a row R3 of the table 310, an IP address, which is acquired by the information acquisition unit 220, of each of the printing apparatuses 50 is displayed.

In addition, in a row R4 of the table 310, a model name, which is acquired by the information acquisition unit 220, of each of the printing apparatuses 50 is displayed. In addition, in a row R5 of the table 310, the work state (status), which is acquired by the information acquisition unit 220, of each of the printing apparatuses 50 is displayed. In addition, in a row R6 of the table 310, a version of each of the printing apparatuses 50 is displayed. Here, as the version of the printing apparatus 50, for example, it is possible to use a version of software installed in the controller 100 which is connected to each of the printing apparatuses 50.

In addition, in a row R7 of the table 310, a residual quantity of paper in each of the printing apparatuses 50 is displayed for each paper tray which accommodates the paper. In addition, in a row R8 of the table 310, a residual quantity of the toner in each of the printing apparatuses 50 is displayed for each color of the toner.

In addition, in a case where the print data (job) which is being processed exists in each of the printing apparatuses 50, a print data name (job name) is displayed in a row R9 of the table 310, a print data state is displayed in a row R10, the number of paper sheets (the number of pages) of the print data is displayed in a row R11, the number of copies of the print data is displayed in a row R12, a print progressing situation of the print data is displayed in a row R13, and time which is required until the output of the print data is completed is displayed in a row R14.

As described above, the pieces of information acquired by the information acquisition unit 220 is displayed in the table 310, it is possible for the manipulator to select the printing apparatus 50, to which printing is instructed, based on the information, and the acceptance unit 230 accepts the instruction. More specifically, in a case where the manipulator touches the line of the table 310 corresponding to a desired printing apparatus 50 to which the printing is instructed, it is possible for the manipulator to designate the printing apparatus 50 to which the printing is instructed.

Furthermore, in the display manipulation screen 300, display of the line corresponding to the selected printing apparatus 50 is inverted. FIG. 5 illustrates the table 310 in a state in which the printing apparatus 50B is selected and the display of the line L1 corresponding to the printing apparatus 50B is inverted.

In the display manipulation screen 300, an acceptance unit 304 is further disposed. The acceptance unit 304 is, for example, a part which accepts an instruction of a type of processing to another printing apparatus 50, such as the printing apparatus 50B, and is capable of accepting the type of processing selected by the manipulator from three processes of postponing the job, postponing the job after RIP (after conversion performed on the print data into the image data), and directly printing. FIG. 5 illustrates the acceptance unit 304 in a state of accepting a manipulation of postponing the job.

In addition, for example, the acceptance unit 304 is capable of accepting an instruction of whether or not to leave the print data acquired after being transferred in the printing apparatus 50 after transferring the print data (job) to another printing apparatus 50 such as the printing apparatus 50B and the like.

Figure 6:
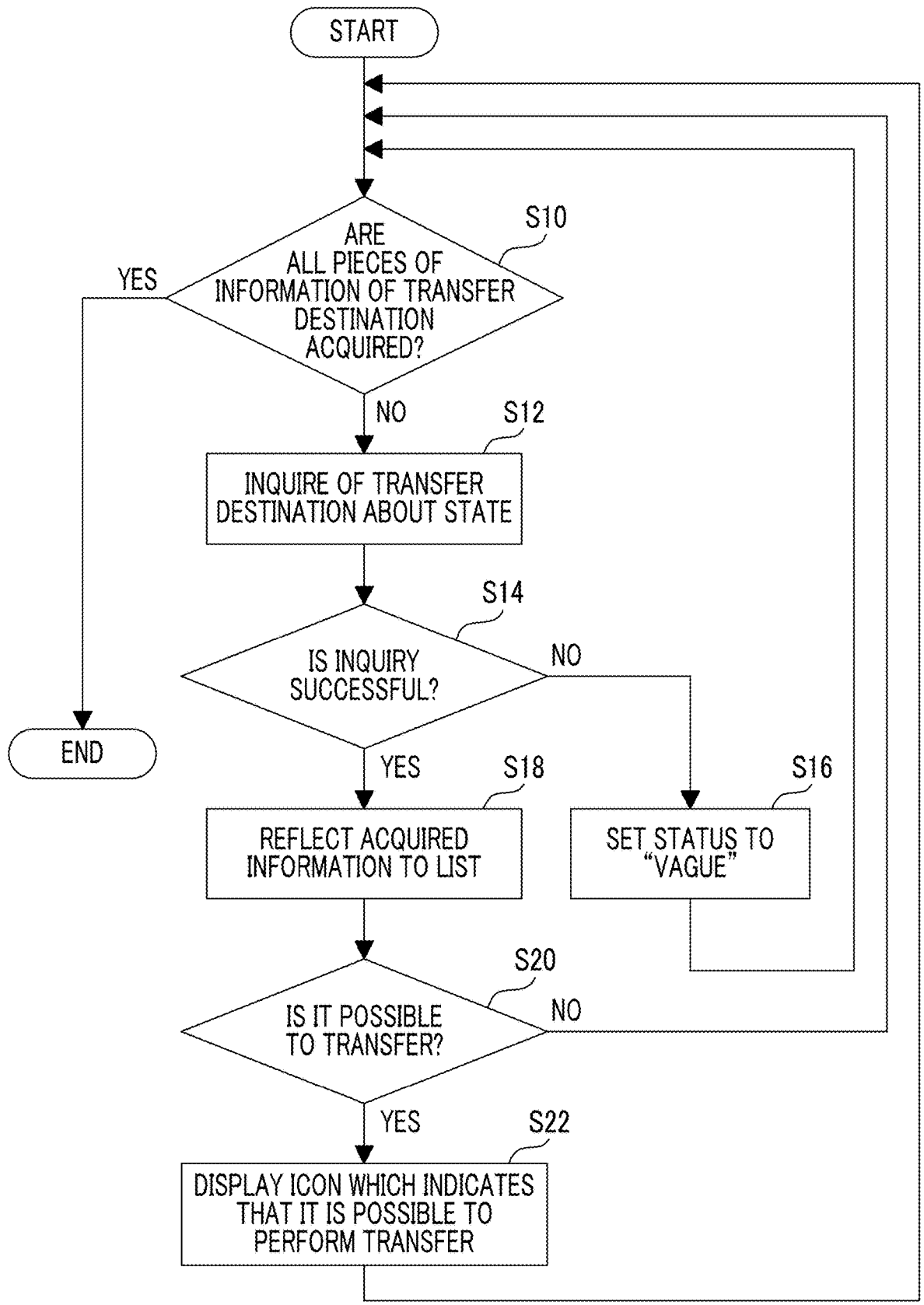
FIG. 6 is a flowchart illustrating an operation of the printing apparatus illustrated in FIG. 2.

FIG. 6 is a flowchart illustrating an operation performed in a case where the controller 100A transmits (transfers) the print data, which is received to print in the printing apparatus 50A, to, for example, another printing apparatus 50 such as the printing apparatus 50B. As illustrated in FIG. 6, in a case where a series of operations is started, it is determined whether or not all the pieces of information of the transfer destination are completely acquired in initial step S10, that is, whether or not all the pieces of information which are displayed in the table 310 are completely acquired for the printing apparatus 50B, the printing apparatus 50C, the printing apparatus 50D, and the printing apparatus 50E. Furthermore, in a case where it is determined that all the pieces of information are completely acquired in step S10, the series of operations ends, and the printing apparatus 50A becomes a state of waiting for a manipulation performed by the manipulator on the touch panel 102.

In contrast, in a case where it is determined that not all the pieces of information of the transfer destinations are acquired in step S10, the process proceeds to step S12.

In step S12, the information acquisition unit 220 inquires of the printing apparatus 50 in which information that is not acquired exists.

In step S14 which is a subsequent step, it is determined whether or not the inquiry in step S12 is successful. That is, it is determined whether or not a response with respect to the inquiry performed in step S12 is provided from the printing apparatus 50B and the like. Furthermore, in a case where the inquiry is successful, the process proceeds to step S18. In a case where the inquiry fails, the process proceeds to step S16.

In step S16, the status (work state) of the printing apparatus 50, which is determined that the inquiry fails in step S14, is set to "vague", and the acquired information display unit 240 displays "vague" on a line, which corresponds to the relevant printing apparatus, of the table 310.

In step S18, the information related to the printing apparatus 50, which is acquired in step S14, is reflected to a list of the table 310 and is displayed.

In step S20 which is a subsequent step, for example, it is determined whether or not it is possible to transmit the print data to another printing apparatus 50, such as the printing apparatus 50B, using the acquired information. Here, as a reference used to determine whether or not to transmit the data to another printing apparatus 50, for example, it is possible to use whether or not a print data input function is available in the printing apparatus 50 at the transfer destination, as in a case where a File Transfer Protocol (FTP) or Line Printer Remote (LPR) is available in the printing apparatus 50 at the transfer destination, whether or not an empty space of a storage device for only storing the print data to be transmitted exists in the controller 100 which controls the printing apparatus 50 at the transfer destination, whether the printing apparatus 50 at the transfer destination is a monochrome printer or a multicolor printer, and a function of the printing apparatus 50 at the transfer destination, such as a size of paper which is accommodated in the printing apparatus 50 at the transfer destination or a type of the post-processing which is allowed to be performed in the printing apparatus 50 at the transfer destination as the reference used to determine whether or not to transmit the print data.

Furthermore, in a case where it is determined that it is not possible to transmit the print data in step S20, the process returns to step S10. In a case where it is determined that it is possible to transmit the print data in step S20, the process proceeds to step S22.

In step S22, the check mark is displayed in the row R1 of the line which corresponds to the printing apparatus 50 in which it is determined that it is possible to transmit the print data in step S20. Furthermore, the process returns to step S10 after the process in step S22 is performed.

Figure 7:
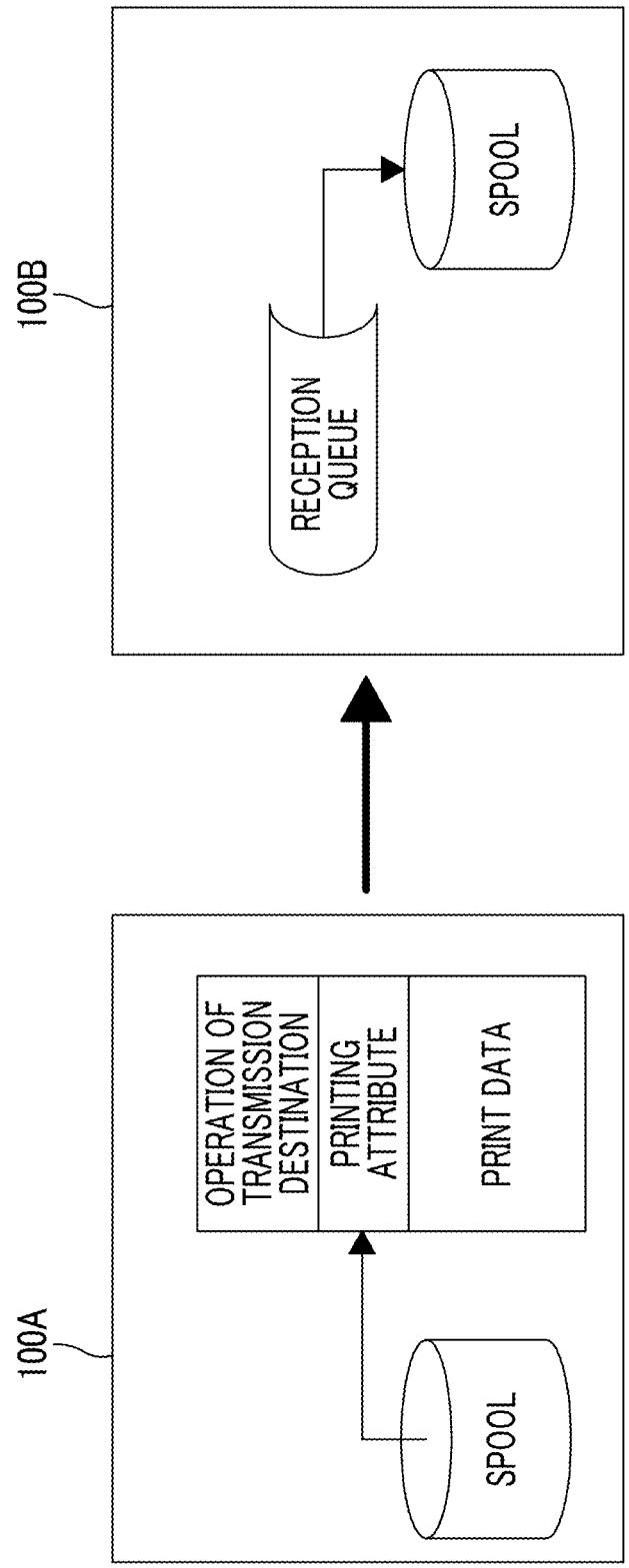
FIG. 7 is a diagram illustrating a first example of transmission of print data from one controller to another controller.

FIG. 7 is a diagram illustrating a first example of an instruction of an operation type of the printing apparatus 50B from the controller 100A to the controller 100B. In the first example, in the controller 100A, the transmission unit 210 not only transmits the print data to the controller 100B but also the acceptance unit 230 transmits the type of processing in the printing apparatus 50B, which is designated in the accepted instruction, with respect to the controller 100B. More specifically, a composite file, which is acquired by composing a file, which includes spooled print data and a printing attribute, with the designation of an operation in the printing apparatus 50B is prepared, and the composite file is transmitted to the controller 100B using, for example, a protocol such as FTP, LPR, or HTTP.

In addition, in the first example, one reception queue is provided in the controller 100B, and the one reception queue receives the above-described composite file.

Figure 8:
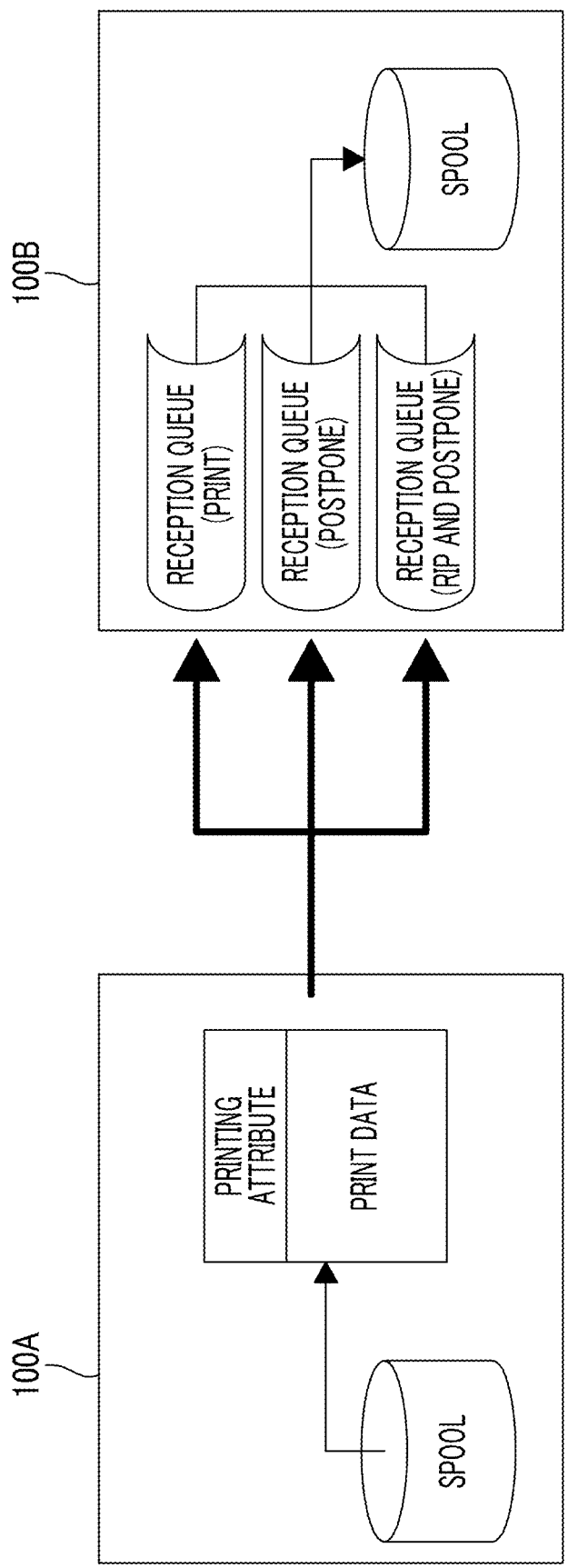
FIG. 8 is a diagram illustrating a second example of transmission of the print data from one controller to another controller.

FIG. 8 is a diagram illustrating a second example of an instruction of an operation from the controller 100A to the controller 100B. In the second example, the controller 100A transmits the print data to any of a plurality of print queues which are prepared in the controller 100B for each type of processing of the print data. Here, each of the print queues is configured as, for example, a virtual printer.

More specifically, the controller 100B is provided with a first reception queue used in a case of directly printing the received print data, a second reception queue used in a case of postponing printing of the received print queue, a third reception queue used, for example, in a case of converting the received print data, such as a Raster Image Processor (RIP), into the image data and postponing printing of the image data acquired through the conversion. The controller 100A transmits the print data to the reception queue corresponding to the process designated by the manipulator.

In addition, in the above-described first example, the controller 100A transmits the composite file, acquired by composing the file which includes the print data and the printing attribute with the designation of the operation in the printing apparatus 50B, to the controller 100B. However, in the second example, the controller 100A transmits the file, which includes the print data and the printing attribute, to the controller 100B.

Figure 9:
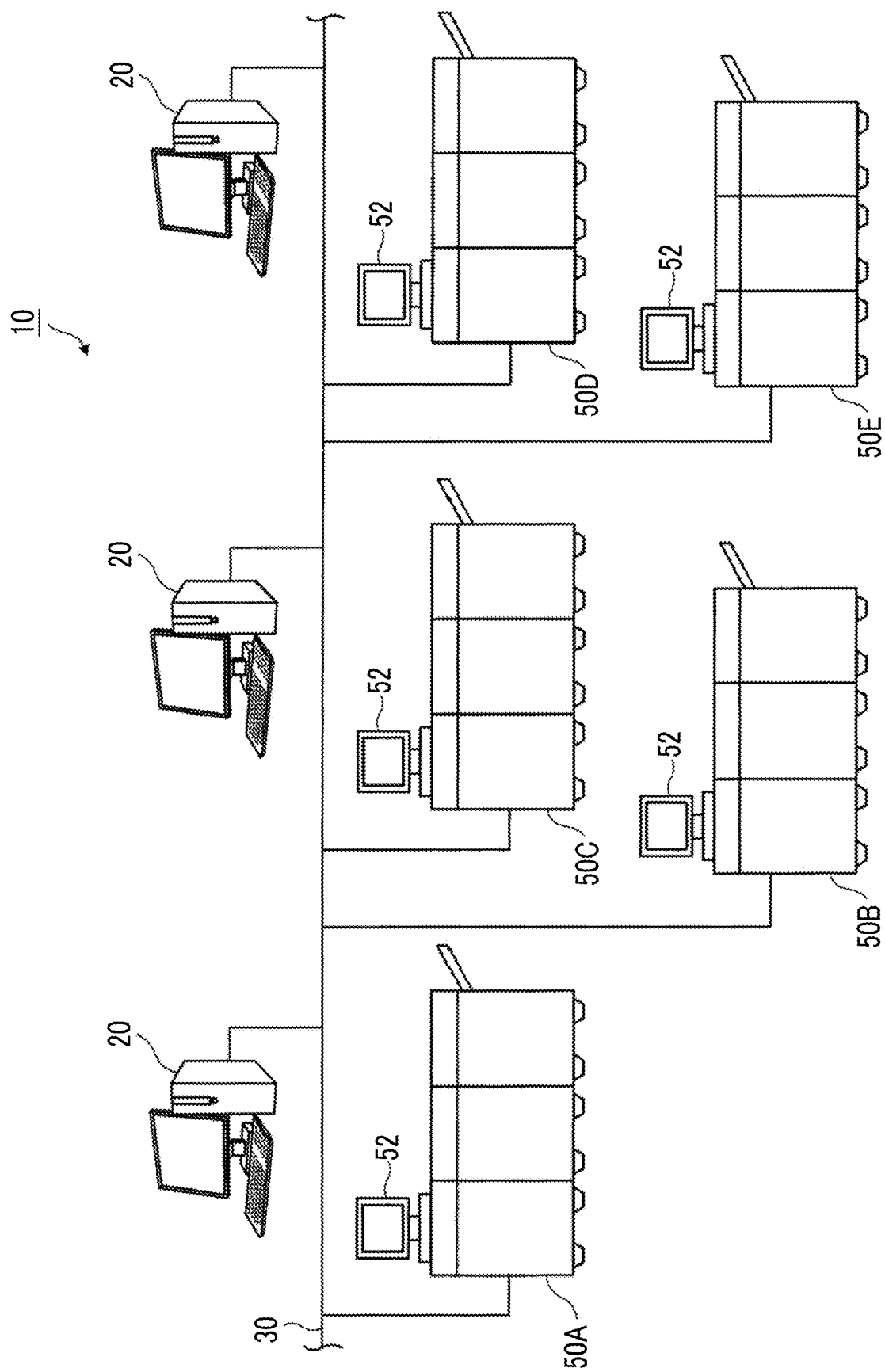
FIG. 9 is a diagram illustrating a configuration of a second example of the printing system used in the exemplary embodiment of the present invention.

FIG. 9 is a diagram illustrating a second example of the printing system 10 according to the exemplary embodiment of the present invention. The first example of the above-described printing system 10 includes the plurality of printing apparatuses 50 and the plurality of controllers 100 which respectively control the plurality of printing apparatuses 50, and the plurality of controllers 100 are respectively connected to the network 30 (refer to FIG. 1). In contrast, in the second example, the controllers are embedded in the printing apparatuses, and the plurality of printing apparatuses 50 in which the controllers are embedded are connected to the network 30.

In addition, in the second example, the printing apparatuses 50 include touch panels 52, respectively.

Figure 10:
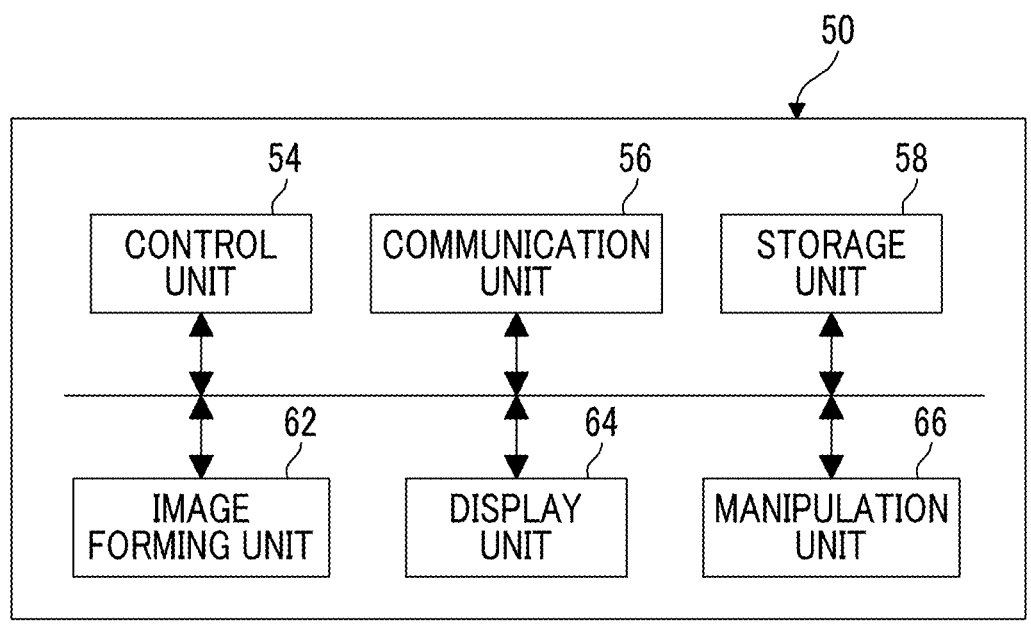
FIG. 10 is a diagram illustrating a hardware configuration of a printing apparatus included in the printing system illustrated in FIG. 9.

FIG. 10 is a diagram illustrating a hardware configuration of the printing apparatus 50 of the printing system 10 in the second example. As illustrated in FIG. 10, the printing apparatus 50 includes a control unit 54 corresponding to the control unit 110 of the above-described first example, a communication unit 56 corresponding to the communication unit 120 of the above-described first example a storage unit 58 corresponding to the storage unit 130 of the above-described first example, a display unit 64 corresponding to the display unit 150 of the above-described first example, a manipulation unit 66 corresponding to the manipulation unit 160 of the above-described first example, and an image forming unit 62.

For example, the image forming unit 62 uses an electronic picture method, and forms an image on paper which is an example of the recording medium.

Figure 11:
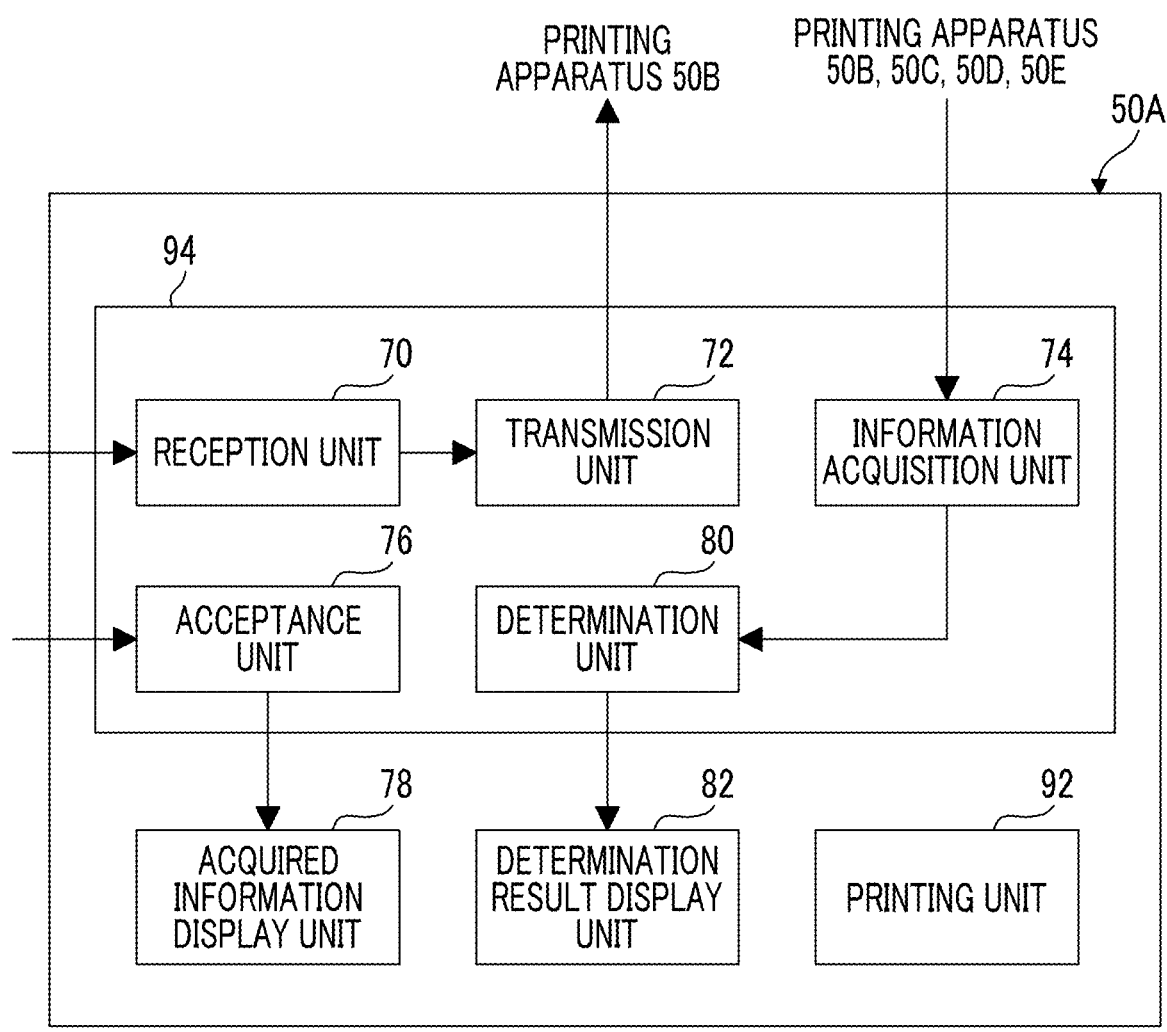
FIG. 11 is a first diagram illustrating a functional configuration of the printing apparatus illustrated in FIG. 10.

FIG. 11 is a diagram illustrating a function in a case where the printing apparatus 50A among the plurality of printing apparatuses 50 is used as the printing apparatus which transmits the print data to another printing apparatus 50B. As illustrated in FIG. 11, the printing apparatus 50A functions as a reception unit 70 corresponding to the reception unit 208 of the above-described first example, a transmission unit 72 corresponding to the transmission unit 210 of the above-described first example, an information acquisition unit 74 corresponding to the information acquisition unit 220 of the above-described first example, a acceptance unit 76 corresponding to the acceptance unit 230 of the above-described first example, an acquired information display unit 78 corresponding to the acquired information display unit 240 of the above-described first example, a determination unit 80 corresponding to the determination unit 250 of the above-described first example, and a determination result display unit 82 corresponding to the determination result display unit 260 of the above-described first example.

In addition, in the printing apparatus 50A, the image forming unit 62 functions as a printing unit 92 by forming an image. In addition, in the printing apparatus 50A, the reception unit 70, the transmission unit 72, the information acquisition unit 74, the acceptance unit 76, and the determination unit 80 configure a print data control unit 94 which controls the print data.

Figure 12:
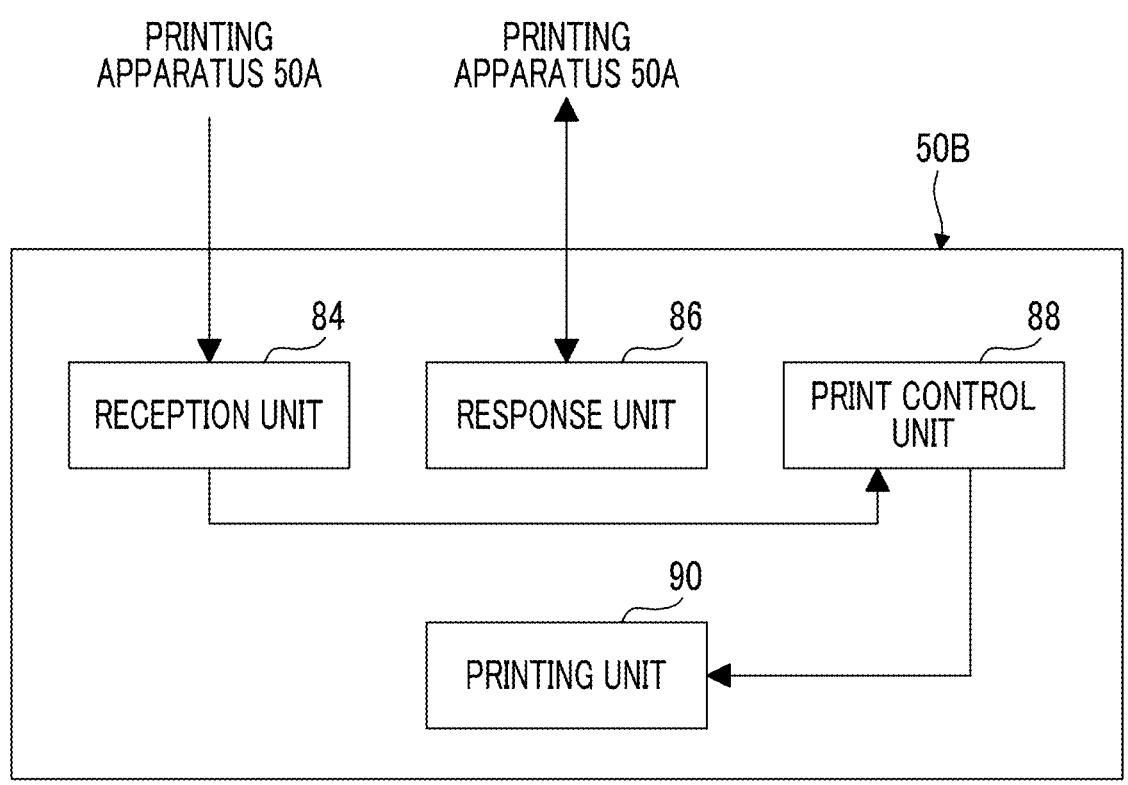
FIG. 12 is a second diagram illustrating the functional configuration of the printing apparatus illustrated in FIG. 10.

FIG. 12 is a diagram illustrating a function of the printing apparatus 50B, and is a diagram illustrating a function in a case where the printing apparatus 50B receives the print data transmitted from the printing apparatus 50A and prints the received print data. As illustrated in FIG. 12, the printing apparatus 50B functions as a reception unit 84 corresponding to the reception unit 280 of the above-described first example, a response unit 86 corresponding to the response unit 290 of the above-described first example, and a control unit 88 corresponding to the print control unit 292 of the above-described first example. In addition, in the printing apparatus 50B, the image forming unit 62 functions as the printing unit 92 by forming an image.

The printing apparatus 50A which is configured as described above includes the printing unit 92 and the print data control unit 94 which controls the print data. The print data control unit 94 includes the reception unit 70 that receives the print data which is printed in the printing unit 92, the transmission unit 72 that transmits the print data which is received by the reception unit 70 to the printing apparatus 50B, the information acquisition unit 74 that acquires the information related to the printing apparatus 50B, and the acceptance unit 76 that accepts an instruction to be transmitted to the printing apparatus 50B, which designates the process type with respect to the print data transmitted by the transmission unit 72, and an instruction selected based on the information acquired by the information acquisition unit 74.

Excluding the parts described above, the second example of the printing system 10 is common to the first example of the above-described printing system 10, and thus description of the common part are not repeated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print data control apparatus comprising a processor configured to:
   receive print data which is to be printed in a first printing apparatus;
   transmit the print data to a second printing apparatus;
   acquire information related to the second printing apparatus; and
   accept an instruction which is to be provided to the second printing apparatus that designates a type of processing with respect to the print data transmitted, that is, an instruction which is selected based on information acquired,
   wherein the processor configured to acquire information related to the second printing apparatus comprising the processor acquires information related to a work state of the second printing apparatus,
   wherein, in a case where the acquired information related to the work state of the second printing apparatus is printing another print data, the processor acquires time until printing of another print data is completely printed, as the information related to the second printing apparatus.

2. The print data control apparatus according to claim 1, the processor configured to display the information acquired.

3. The print data control apparatus according to claim 1, the processor configured to:
   determine whether or not to transmit the print data to the second printing apparatus using the information acquired; and
   display a determination result acquired.

4. The print data control apparatus according to claim 1, wherein the processor configured to acquire pieces of information related to a plurality of the second printing apparatuses, and
   wherein the processor further configured to accept a selection for transmitting the data to any one printing apparatus among the plurality of second printing apparatuses.

5. The print data control apparatus according to claim 1, wherein the processor further configured to transmit a type of processing, which is designated in the instruction accepted to the second printing apparatus.

6. The print data control apparatus according to claim 1, wherein the processor configured to transmit the print data to any one of a plurality of print queues, which are prepared in the second printing apparatus, for each type of processing of the print data.

7. The print data control apparatus according to claim 1, wherein the processor configured to acquire information related to a residual quantity of expendable supplies which are allowed to be used by the second printing apparatus.

8. The print data control apparatus according to claim 7, wherein the processor configured to acquire a residual quantity of recording media, which are allowed to be used by the second printing apparatus, as the information related to the second printing apparatus.

9. The print data control apparatus according to claim 7, wherein the processor configured to acquire a residual quantity of inks, which are allowed to be used by the second printing apparatus, as the information related to the second printing apparatus.

10. The print data control apparatus according to claim 1, wherein the processor configured to acquire information related to a performance of the second printing apparatus.

11. The print data control apparatus according to claim 10, wherein the processor configured to acquire information for specifying a model of the second printing apparatus, as the information related to the second printing apparatus.

12. The print data control apparatus according to claim 11, wherein the processor further configured to acquire a version of the second printing apparatus as the information related to the second printing apparatus.

13. The print data control apparatus according to claim 10, wherein the processor configured to acquire a type of post-processing, which is allowed to be performed in the second printing apparatus, as the information related to the second printing apparatus.

14. The print data control apparatus according to claim 10, wherein the processor configured to acquire a capacity of the print data, which is allowed to be stored in a storage device of the second printing apparatus, as the information related to the second printing apparatus.

15. The print data control apparatus according to claim 1, wherein the processor configured to accept an instruction to cause the second printing apparatus to convert the print data into image data and to postpone printing the image data.

16. A printing apparatus comprising a processor, configured to:
   control print data, wherein control print data includes
   receive the print data which is to be printed,
   transmit the print data to an external printing apparatus,
   acquire information related to the external printing apparatus, and accept an instruction which is to be provided to the external printing apparatus that designates a type of processing with respect to the print data transmitted, that is, an instruction which is selected based on information acquired, wherein the processor configured to acquire information related to the second printing apparatus comprising the processor acquires information related to a work state of the second printing apparatus, wherein, in a case where the acquired information related to the work state of the second printing apparatus is printing another print data, the processor acquires time until printing of another print data is completely printed, as the information related to the second printing apparatus.

17. A printing system comprising:

a first printing apparatus;

a second printing apparatus; and a processor, configured to:

control print data which is to be printed in the first printing apparatus or the second printing apparatus, wherein the print data control apparatus includes receive the print data which is printed in the first printing apparatus, transmit the print data to the second printing apparatus, acquire information related to the second printing apparatus, and accept an instruction which is to be provided to the second printing apparatus that designates a type of processing with respect to the print data transmitted, that is, an instruction which is selected based on information acquired, wherein the processor configured to acquire information related to the second printing apparatus comprising the processor acquires information related to a work state of the second printing apparatus, wherein, in a case where the acquired information related to the work state of the second printing apparatus is printing another print data, the processor acquires time until printing of another print data is completely printed, as the information related to the second printing apparatus.

18. A print data control apparatus comprising a processor configured to:

receive print data which is to be printed in a first printing apparatus;

transmit the print data to a second printing apparatus;

acquire information related to the second printing apparatus; and accept an instruction which is to be provided to the second printing apparatus that designates a type of processing with respect to the print data transmitted, that is, an instruction which is selected based on information acquired, wherein the processor configured to acquire information related to the second printing apparatus comprising the processor acquires information related to a work state of the second printing apparatus, wherein, in a case where the acquired information related to the work state of the second printing apparatus is waiting for another print data to be printed, the processor acquires the number of print data, which is waiting to be printed, as the information related to the second printing apparatus.

* * * * *